United States Patent
Schumacher et al.

(10) Patent No.: US 10,457,237 B2
(45) Date of Patent: Oct. 29, 2019

(54) DEVICE AND METHOD FOR PROVIDING AN ACTIVATION VOLTAGE FOR A SAFETY UNIT FOR A VEHICLE, AND SAFETY DEVICE

(71) Applicant: Robert Bosch GmbH, Stuttgart (DE)

(72) Inventors: Hartmut Schumacher, Freiberg (DE); Thomas Henig, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 15/928,168

(22) Filed: Mar. 22, 2018

(65) Prior Publication Data

US 2018/0281719 A1    Oct. 4, 2018

(30) Foreign Application Priority Data

Apr. 3, 2017 (DE) .......................... 10 2017 205 618

(51) Int. Cl.
*B60R 21/017* (2006.01)
*B60R 16/033* (2006.01)
*B60R 21/01* (2006.01)

(52) U.S. Cl.
CPC .......... *B60R 21/017* (2013.01); *B60R 16/033* (2013.01); *B60R 2021/01006* (2013.01); *B60R 2021/01286* (2013.01)

(58) Field of Classification Search
CPC ................ B60R 21/017; B60R 16/033; B60R 2021/01286; B60R 2021/01006
See application file for complete search history.

(56) References Cited

U.S. PATENT DOCUMENTS

| 5,311,065 | A | 5/1994 | Kondo |
| 5,675,242 | A | 10/1997 | Nakano |
| 2004/0183515 | A1* | 9/2004 | Ota .......................... G05F 3/267 323/315 |
| 2006/0038584 | A1* | 2/2006 | Mitsuda ............. H03K 17/0822 326/33 |
| 2014/0277949 | A1 | 9/2014 | Ito et al. |
| 2017/0158152 | A1* | 6/2017 | Karner .................. B60R 21/017 |

\* cited by examiner

*Primary Examiner* — Rexford N Barnie
*Assistant Examiner* — Thai H Tran
(74) *Attorney, Agent, or Firm* — Norton Rose Fulbright US LLP; Gerard Messina

(57) ABSTRACT

A device for providing an activation voltage for a safety unit for a vehicle. The device includes a supply terminal for applying a first supply voltage potential, an activation terminal for outputting the activation voltage, and a control terminal for reading in a control signal. In addition, the device includes a pass-through switch that is connected between the supply terminal and the activation terminal, a first control switch, a second control switch, and a third control switch that includes a control input that is connected to the control terminal.

15 Claims, 2 Drawing Sheets

DEVICE AND METHOD FOR PROVIDING AN ACTIVATION VOLTAGE FOR A SAFETY UNIT FOR A VEHICLE, AND SAFETY DEVICE

CROSS REFERENCE

The present application claims the benefit under 35 U.S.C. § 119 of German Patent Application No. DE 102017205618.5 filed on Apr. 3, 2017, which is expressly incorporated herein by reference in its entirety.

BACKGROUND INFORMATION

The present invention relates to a device and a method for providing an activation voltage for a safety unit for a vehicle.

Airbags in vehicles may be triggered using safety semiconductors.

SUMMARY

In accordance with the present invention, an example device and an example method for providing an activation voltage for a safety unit for a vehicle and a safety device are. Advantageous refinements and improvements of the device and method are described herein.

In accordance with the present invention, as the result of a suitable design of a device, designed as a safety semiconductor, for example, for providing an activation voltage, for example for actuating an airbag, the power consumption of the device may be kept very low.

In accordance with the present invention, an example of such a device for providing an activation voltage, in particular a limited, switchable (high-/low-impedance) trigger high-side supply voltage, for a safety unit for a vehicle includes the following features:

a supply terminal for applying a first supply voltage potential, an activation terminal in the form of an output for outputting the activation voltage, a control terminal for reading in a control signal, and a ground terminal for a second supply potential, also referred to as a second supply voltage potential or ground;

a pass-through switch with a control input, the pass-through switch being connected between the supply terminal and the activation terminal and designed for providing a conductive connection between the supply terminal(s) and the activation terminal when a first signal level is present at the control input, and for blocking the conductive connection between the supply terminal(s) and the activation terminal when a second signal level is present at the control input;

a first control switch with a first terminal, a second terminal, and a control input, the first terminal being connected to the control input of the pass-through switch, the second terminal being connected to the activation terminal, and the control input being connected to the control input of the pass-through switch via a first resistor;

a second control switch with a first terminal, a second terminal, and a control input, the first terminal being connected to the control input of the first control switch via at least one second resistor, the second terminal being connected to a second supply voltage potential, and the control input being connected to the supply terminal via at least one third resistor and to the second supply voltage potential via a diode; and a third control switch with a first terminal, a second terminal, and a control input, the first terminal being connected to the control input of the second control switch, the second terminal being connected to the second supply voltage potential, and the control input being connected to the control terminal.

The device may be implemented as a safety semiconductor that is switchable between a power supply of the vehicle and the safety unit. The first supply voltage potential may be a supply voltage, and the second supply voltage potential may be a ground potential. The device may be designed for providing the activation voltage when a suitable control signal is present at the control terminal. Due to the use of the control switches, on the one hand the power consumption of the device may be reduced, and on the other hand a reliable provision of the activation voltage may be ensured. In addition, accidental deployments due to an undesirable provision of the activation voltage may be avoided. When two circuit elements are "connected" to one another, this may mean that they are directly joined together via a through line or via at least one additional element, for example a resistor. According to one specific embodiment, a pass-through switch may be understood to mean a limiter.

The second control switch may be designed in such a way that the second control switch is open when the third control switch is closed in response to the control signal read in by the control terminal. Due to opening of the second control switch, the pass-through switch/limiter may be closed, and the low-impedance limited activation voltage may thus be provided.

The device may include two second resistors connected in parallel. In this way, reliable functioning of the device may be ensured even if one of the two second resistors fails.

In addition, the device may include a series connection made up of a first resistor pair connected in parallel and a second resistor pair connected in parallel. Redundancy is thus achieved, thereby increasing the reliability of the device.

The device may include a limit switch (impedance converter, decoupling transistor of a Zener voltage, ZD1) with a first terminal, a second terminal, and a control input. The first terminal may be connected to the supply terminal, the second terminal may be connected to the control input of the pass-through switch via series resistors Rg1, Rg2, and the control input may be connected to the supply terminal via at least one fourth resistor and to the second supply voltage potential via a precision Zener diode. A suitable signal level may be provided at the control input of the pass-through switch via the limit switch.

The switches may be designed as transistors. This is a cost-effective and reliable implementation form. The pass-through switch may be designed as a power MOS transistor. The first control switch may be designed as a bipolar transistor. The second control switch may be designed as an NMOS transistor.

The device may be designed in such a way that the device is suitable for sleep airbag control units; i.e., even for a permanent power supply to the terminals of the supply terminal, up to 16.5 V no current (<2 µA at 40° C.) is drawn, provided that no collision occurs.

In accordance with the present invention, an example safety device for a vehicle includes the following features:

a stated device for providing an activation voltage for a safety unit for a vehicle;

at least one vehicle battery that is switchably or permanently connected to the supply terminal and the ground terminal of the device in order to provide a battery voltage, as the first supply voltage potential against the ground terminal, to the supply terminal;

an energy reserve unit that is connected to the supply terminal of the device in order to provide a reserve voltage, as the first supply voltage potential, to the supply terminal; and a safety unit that is connected to the activation terminal of the device in order to be supplied by the activation voltage (high-impedance and voltage-limited in the normal case, or low-impedance and voltage-limited in the event of a collision).

The example device may thus be used as a safety semiconductor.

The safety device may optionally include at least one vehicle battery, which as a permanent power supply is connected to the supply terminal, and as a switched power supply is connected to the supply terminal and to the reference point (ground terminal) of the device in order to provide a battery voltage, as the first supply voltage potential against the ground terminal, to the supply terminal.

The example safety unit may be an occupant protection device, for example an airbag or a seat belt tensioner.

In accordance with the present invention, an example method for providing an activation voltage for a safety unit for a vehicle, using the example device for providing an activation voltage, includes the following steps:

applying a first supply voltage potential to the supply terminal of the device; and providing the control signal to the control terminal of the device.

This method may be implemented, for example, in a control unit, for example in software or hardware or in a mixed form of software and hardware.

In the present context, a device may be understood to mean an electrical device which processes sensor signals and outputs control and/or data signals as a function thereof. The device may include an interface which may have a hardware and/or software design. In a hardware design, the interfaces may be part of a so-called system ASIC, for example, which contains various functions of the device. However, it is also possible for the interfaces to be dedicated, integrated circuits, or to be at least partially made up of discrete components. In a software design, the interfaces may be software modules which are present on a microcontroller, for example, in addition to other software modules.

Exemplary embodiments of the present invention are illustrated in the figures and are explained in greater detail below.

DETAILED DESCRIPTION OF EXAMPLE EMBODIMENTS

Figure 1:
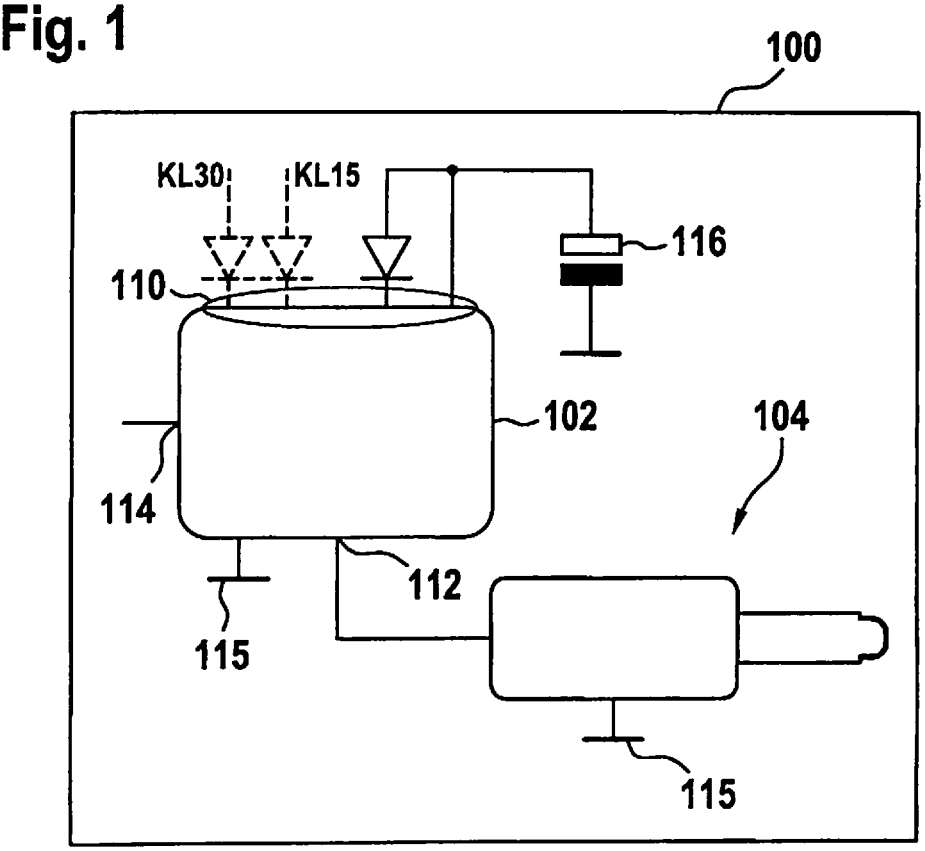
FIG. 1 shows a schematic illustration of a vehicle that includes a device for providing an activation voltage for a safety unit according to one exemplary embodiment.

In the following description of advantageous exemplary embodiments of the present invention, identical or similar reference numerals are used for the elements having a similar action which are illustrated in the various figures, and a repeated description of these elements is dispensed with.

FIG. 1 shows a schematic illustration of a vehicle 100 that includes a device 102 for providing an activation voltage for a safety unit 104 according to one exemplary embodiment.

Safety unit 104 includes, for example, an FLIC/S-ASIC circuit and a trigger unit with which, for example, an airbag may be triggered, which likewise may be part of safety unit 104.

According to this exemplary embodiment, device 102 is designed as a safety semiconductor module (SH), and includes a supply terminal 110 for applying one or multiple first supply voltage potentials, an activation terminal 112 for outputting the activation voltage, and a control terminal 114 for reading in a control signal. In addition, device 102 includes a terminal for a second supply voltage potential, in the present case a ground terminal 115, also referred to as a reference point or ground reference point.

Supply terminal 110 includes, for example, three contacts via which the device is supplied with three different reverse polarity-protected voltage potentials in the form of a battery voltage KL30 (permanent), a battery voltage KL15/KL15R (switchable), and an energy reserve voltage VER<40 V (during active operation) of energy reserve unit 116 for the case of activation. Reverse polarity-unprotected energy reserve voltage VER of energy reserve unit 116 is used to provide the voltage-limiting boundary of activation voltage VH, for example via a fourth contact 230 in supply terminal 110.

The control signal, also denoted as reference symbol P_SH or P_SVR, may be read in via control terminal 114. Device 102 is designed for switching the activation voltage, also denoted as reference symbol VH, into a low-impedance voltage-limited state with respect to supply voltages 220, 224, 228, or into a blocking state with respect to supply voltages 220, 224, 228, and into a high-impedance voltage-limited state with respect to supply voltage VER 230, as a function of a signal status of the control signal. In addition, device 102 is designed for carrying out a limitation of voltage VH.

According to one exemplary embodiment, device 102 functions in such a way that device 102 blocks (high-impedance=1.21 kohm, limiting the voltage). In the "blocked" (T_P blocked) state of device 102, the following applies: activation voltage VH=VH_HZ=VH_lim*(Rb2_1 II Rb2)/(Rb2_1 II Rb2+Rg1+Rg2)+0.1 V for IVH=0, when the control signal has the signal status "high Z" or "low," and conducts (low-impedance≈5Ω . . . 50 mΩ, limiting the voltage) when the control signal has the status "high." In the conducting state of device 102, the following applies: activation voltage VH=VH_LZ≤VH lim−VGth.

According to one exemplary embodiment, device 102 is a safety semiconductor for a triggering from a battery and an energy reserve 116 without power consumption in the so-called sleep state.

Device 102 is described below by way of example with reference to an airbag system to which a permanent power supply (KL30) may be applied. The system is started up or put to sleep via a bus communication, for example a CAN/FlexRay communication, and/or a so-called wake-up line.

It is necessary to maintain a low system supply current in the sleep state. Device 102 in the form of a safety semiconductor, for example as an independent component, is connected in series with the trigger circuit high-side and low-side output stages. Device 102 may switch off battery lines connected to supply terminal 110, as well as an energy reserve line to energy reserve unit 116, and in the event of a collision may enable the power supply from energy reserve 116 and/or battery in a targeted manner.

In addition, the output voltage provided at activation terminal 112 is regulated and/or limited in order to optimally distribute the power loss to the trigger circuit components during the triggering.

Device 102 may advantageously utilize permanent power supply KL30 without exceeding the limiting values for the system supply current in the sleep state (sleep current).

For example, the supply current of device 102 may be less than 2 µA, robustness against moisture or the reliable blocking and/or enabling of the power supply from KL30 or energy reserve 116 being provided.

By use of device 102, it is possible to meet the requirements for airbag systems, which include a sleep function, in other supply situations. In particular it is made possible to maintain the sleep current of ≤100 µA for the overall system even if, as a requirement, KL30 (steady plus), and not solely KL15 (trigger), is used as an input variable for device 102.

Furthermore, a high level of robustness against leaks, for example moisture, is provided without the power consumption further increasing in the sleep case. Likewise, measures may be initiated so that the effect of assembly errors during manufacture is further limited, and additional test measures may be dispensed with. This may be achieved by a targeted use of redundancy and diversity.

A pass-through switch in the form of a power MOSFET transistor may be used as an important part of the design of device 102. The voltage supplies provided for the triggering, in the present case voltages KL15, KL30 and the voltage of energy reserve 116, are supplied to device 102 with reverse polarity protection. Device 102 is enabled or blocked with the aid of a driver stage. The blocking will become effective when a relevant input voltage is present at device 102, even before the internal supply voltages may be built up during start-up of the airbag system.

According to one exemplary embodiment, device 102 is reliably controllable by a standard I/O terminal of a microprocessor having I/O voltages of 5 V or 3.3 V. Device 102 is likewise securely blocked in the reset state.

When device 102 is designed as a power NMOS transistor, by specifying a suitable gate voltage the output voltage may be limited in the actuation case (collision), and the power loss may thus be distributed between the device and the airbag high-side output stage.

Figure 2:
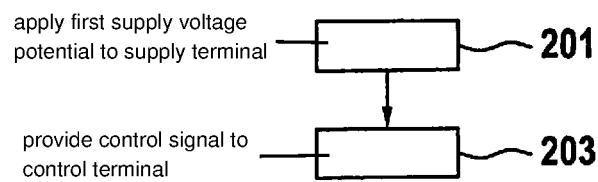
FIG. 2 shows a flow chart of a method according to one exemplary embodiment.

FIG. 2 shows a flow chart of a method for providing an activation voltage for a safety unit for a vehicle. A device as described with respect to FIGS. 1 and 3, for example, may be used for this purpose. A first supply voltage potential is applied to the supply terminal of the device in a step 201. A control signal is provided to the control terminal of the device in a step 203. The device is controlled by the control signal in such a way that the device provides the activation voltage, using the first supply voltage potential.

Figure 3:
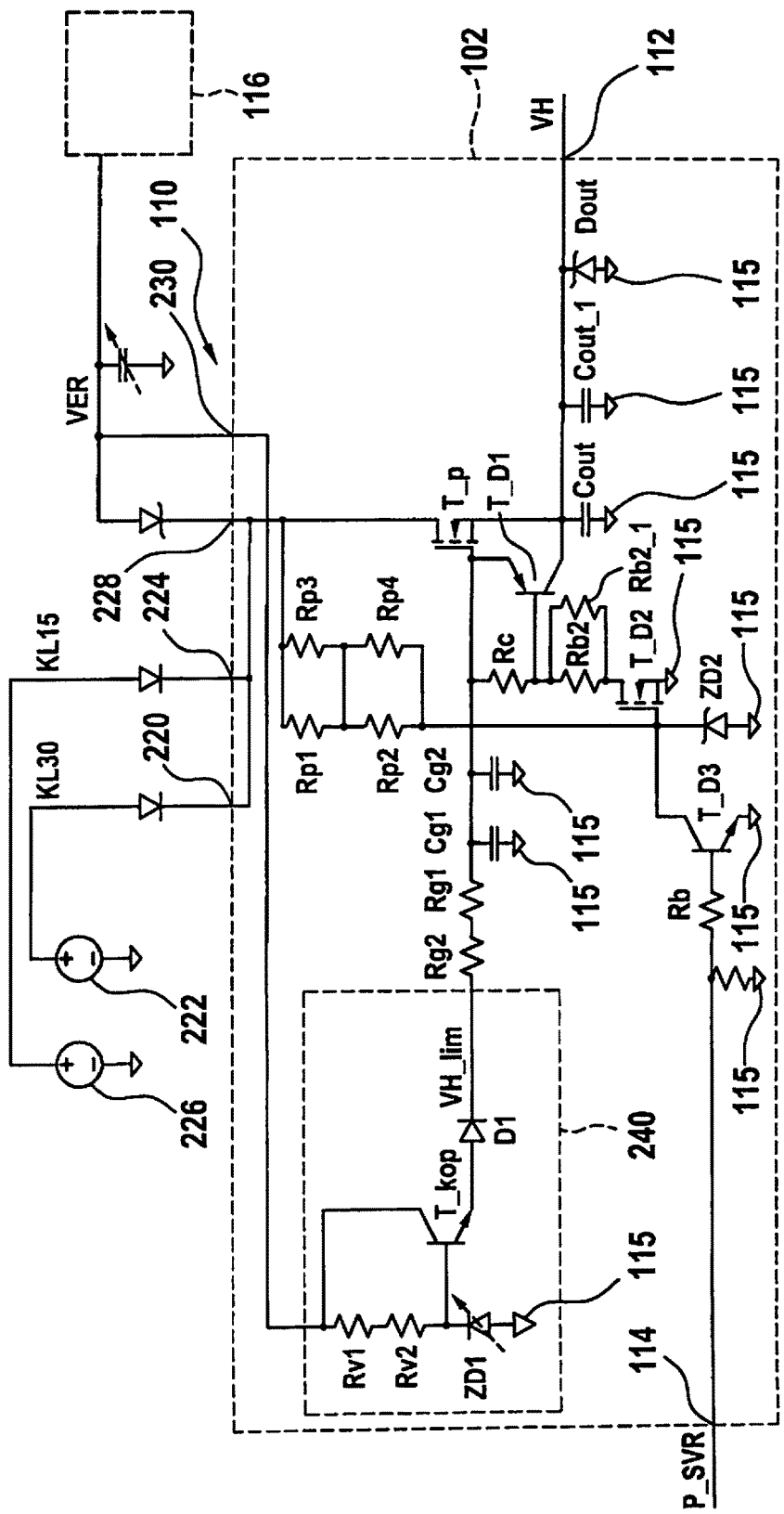
FIG. 3 shows a circuit diagram of a device for providing an activation voltage according to one exemplary embodiment.

FIG. 3 shows a circuit diagram of a device 102 for providing an activation voltage VH according to one exemplary embodiment. This may be an exemplary embodiment of the device described with reference to FIG. 1.

A first contact 220 of first supply terminal 110 of device 102 is connected via a diode to a first vehicle battery 222 for providing a voltage KL30. A second contact 224 of first supply terminal 110 is connected via a diode to a second vehicle battery 226 for providing a switched voltage KL15.

This generally involves only one vehicle battery with generator buffering, which is permanently connected via a reverse polarity protector (diode) to terminal 220 of supply terminal block 110, and via a switched line, the same vehicle voltage (vehicle battery with generator buffering), likewise via a reverse polarity protector (diode), is switchably connected to second terminal 224 of supply terminal block 110. The switch is closed upon triggering/ignition (reference symbol KL15) or in the radio/accessory setting (reference symbol KL15R).

A third contact 228 of first supply terminal 110 is connected via a reverse polarity protector (diode) to an energy reserve unit 116 for providing a reverse polarity-protected energy reserve voltage. A fourth contact 230 of first supply terminal 110 is likewise connected to energy reserve unit 116, without reverse polarity protection.

Device 102, designed as safety semiconductor SH, includes a unit 240 for providing a stabilized VH limiting voltage VH_lim, which is connected to fourth contact 230 on the input side.

In addition, device 102 includes a pass-through switch T_p, a first control switch T_D1, a second control switch T_D2, and a third control switch T_D3.

Pass-through switch T_p is connected between contacts 220, 224, 228 of supply terminal 110 and activation terminal 112. Pass-through switch T_p includes a control input. Pass-through switch T_p is closed when a first signal level is present at the control input, and pass-through switch T_p is open when a second signal level is present at the control input.

A first terminal of first control switch T_D1 is connected to the control input of pass-through switch T_p, and a second terminal of pass-through switch T_p is connected to activation terminal 112. The control input of first control switch T_D1 is connected to the control input of pass-through switch T_p via a resistor Rc.

A first terminal of second control switch T_D2 is connected to the control input of first control switch T_D1 via two resistors Rb2, Rb2_1, for example, and a second terminal of second control switch T_D2 is connected to ground 115. The control input of second control switch T_D2 is connected to contacts 220, 224, 228 of supply terminal 110 via four resistors Rp1, Rp2, Rp3, Rp4, for example. Resistors Rp1, Rp3 are connected in parallel, and resistors Rp2, Rp4 are likewise connected in parallel. First terminals of resistors Rp1, Rp3 are connected to contacts 220, 224, 228, second terminals of resistors Rp1, Rp3 are connected to first terminals of resistors Rp2, Rp4, and second terminals of resistors Rp2, Rp4 are connected to the control input of second control switch T_D2. The control input of second control switch T_D2 is also connected to ground 115 via a diode ZD2.

A first terminal of third control switch T_D3 is connected to the control input of second control switch T_D2, and a second terminal of third control switch T_D3 is connected to ground 115. A control input of third control switch T_D3 is connected to control terminal 114. A resistor Rb is connected, for example, between control terminal 114 and the control input of third control switch T_D3. In addition, control terminal 114 is connected to ground 115 via a resistor Rbe1.

Activation terminal 112 is connected to ground 115 via capacitors Cout, Cout_1 and a diode Dout, for example.

Unit 240 includes a limit switch (impedance converter) T_kop. A first terminal (collector, drain) of limit switch T_kop is connected to the start of the series connection of the series resistors formed from Rv1, Rv2, and is additionally connected to contact 230 of supply terminal 110. A second terminal (emitter, source) of limit switch T_kop is connected via a diode D1 to an output of unit 240, at which voltage VH_lim is provided by unit 240. A control input (base, gate) of limit switch (base) T_kop is connected to the cathode of Zener diode ZD1, which is likewise connected to one end of the series connection made up of Rv1, Rv2. By selecting the suitable Zener voltage of diode ZD1, voltage VH_lim may be adjusted in such a way that it is optimally suited for safety unit 104. The anode of Zener diode ZD1 is connected to ground 115.

The output of unit 240, via which voltage VH_lim is provided, is connected, for example, to the control input (gate) of pass-through switch T_p via a series connection of the two resistors Rg1, Rg2. The control input of pass-through switch T_p is also connected, for example, to ground 115 via two capacitors Cg1, Cg2 connected in parallel.

In an airbag application, a reverse polarity-protected high-current connection to energy reserve voltage VER of energy reserve capacitor C_ER is present, the energy reserve voltage being brought to the voltage suitable for the operating phases by a charging/discharging unit 116.

Depending on the application requirements, further high-current connections to vehicle voltages KL15, KL30 are provided. The high-current inputs are connected to input voltage SH_IN of device 102, also referred to as the first supply potential, in device 102 as a "wired OR." The wired OR connection ensures that in the event of triggering, energy reserve voltage VER, if present, is assisted by battery voltage KL15, KL30. In this way, trigger circuit activations are thus possible even when there is not a sufficient energy reserve, or if an ER electrolytic capacitor breaks off.

Reverse polarity-unprotected energy reserve voltage VER is utilized as control voltage for device 102. This is used to ensure that no control voltage of power MOS transistor T_p of device 102 is still present at the moment that vehicle voltage KL15, as input voltage of device 102, is switched on. This is built up only after control is completed, for example by a system controller, by slowly building up energy reserve voltage VER with the aid of the microcontroller-controllable charger/discharger for energy reserve unit 116. This is likewise the case when in sleep systems, vehicle voltage KL30 as input voltage of device 102 remains in switched-off vehicles. In this case, control voltage for power MOS transistor T_p of device 102 is no longer present after the autarchy time elapses, and after a subsequent active discharge by discharge unit 116 with final passive discharge of the energy reserve in an airbag system.

For controlling device 102, an input present in the form of control input 114 is connectable, for example, to an I/O port of the airbag microcontroller. The control may take place via 3.3 V I/O or 5 V I/O. The control is used to intensify active blocking of device 102, or to activate, in so-called guiding control, power MOSFET transistor T_p for test purposes or in the event of a collision.

According to the exemplary embodiment shown in FIG. 3, power MOS transistor T_p, also referred to as T_power_NMOS, is controlled by bipolar transistor T_D1. If an airbag control unit is in the sleep state, in the worst case, voltage KL30 may be present at the input of device 102 with reverse polarity protection. Otherwise, further voltages are no longer present, since the vehicle is not in use. In such a case, the energy reserve is already reduced a few 100 ms after the vehicle is switched off (due to energy withdrawal for autarchy time system supply and additional active and passive discharging (unit 116)).

In this sleep case, high demands are placed on the power consumption of control units, in the present case device 102, supplied by KL30. To meet this requirement, a further signal transistor T_D2 as NMOS is inserted into the circuitry of device 102. This transistor T_D2 has a preferably low gate threshold voltage, so that even the smallest KL30 voltage present may be utilized to ensure reliable blocking of power MOS output stage T_p.

Transistor T_D2 is controlled via redundant resistors Rp1, Rp2, Rp3, Rp4. The four-resistor structure of resistors Rp1, Rp2, Rp3, Rp4 ensures that no impermissible state can arise, even if one resistor Rp1, Rp2, Rp3, Rp4 fails, for example due to a power interruption or a short circuit. In addition, dimensioning of resistors Rp1, Rp2, Rp3, Rp4 is possible while maintaining very robust design rules, for example less than 100 kohms and moisture, without violating the sleep current requirements for present safety semiconductor circuits.

To ensure that no impermissible voltages damage transistor T_D2 under jump start conditions, a gate terminal diode ZD2 having an 18 V terminal voltage, for example, is provided. This is necessary since standard signal MOSFETS must not be loaded with gate voltages above 20 V. An appropriate terminal structure is generally integrated into the MOSFET, although external redundancy should additionally be provided, in the present case in the form of diode ZD2. In the sleep case this has no effect on the sleep current of device 102, since with parked vehicles (no operation), vehicle voltage KL30 is provided by vehicle battery 222, not by the generator. However, this voltage is generally not above 13.8 V in the case of a lead battery, as the result of which no terminal current is discharged into diode ZD2.

In the operation case (airbag in operation), for an energy reserve voltage of 33 V and an effective pull-up resistor Rp1 II Rp3=42.85 k and Rp2 II Rp4=43.25 k, for a total of 86.1 k, passive or active locking by P_SVR=high Z/low with a static current withdrawal for IRp≤[33 V (VER)−18 V (ZD2)]/86.1 k=0.174 mA from energy reserve 116 is to be expected.

Transistor T_D2, which is controlled by pull-up resistors Rp1, Rp2, Rp3, Rp4, allows an emitter base current in PNP bipolar gate source transistor T_D1 across resistors Rb2, Rb2_1.

Transistor T_D1 provides for a blockage of power NMOS transistor T_p via the conducting emitter collector path.

Two base resistors Rb2, Rb2_1 are used in order to still reliably control transistor T_D1 and actively lock power_NMOS transistor T_p in the event of interruption of a resistor Rb2, Rb2_1.

Resistors Rb2, Rb2_1 may also have different designs in order to be assembled from two different tapes during manufacture. This increases the robustness against errors (incorrect tape, etc.) during manufacture, without safety-relevant or systematic effects. This method has basically been applied in this safety-relevant circuit where necessary (Rp1≠RP3≠RP2≠RP4; Rg1≠Rg2; Rv1≠Rv2; Rb2≠Rb2_1).

Resistor Rc ensures rapid control in the event of a collision or during testing of device 102 by clearing the emitter base path of transistor T_D1.

Voltage VER of energy reserve unit 116 directly supplied to device 102 is clamped to a desired limiting value, for example to 27 V, via resistors Rv1, Rv2 and Zener diode ZD1. This voltage is nonreacting, at least essentially non-reacting, across decoupling transistor T_kop and diode D1, and specified, with reverse polarity protection, for device 102 as a limiting reference variable for the output voltage provided at activation terminal 112 in the event of a collision or during testing. Any desired voltage VH_lim in the control case may be achieved by suitable selection of the terminal voltage of Zener diode ZD1.

By use of a control signal P_SVR=High that is read in at control terminal 114, bipolar transistor T_D3 is controlled, and NMOS_FET T_D2 as well as PNP transistor T_D1 are blocked. Limited voltage VH_lim across resistors Rg1, Rg2 is thus available to power_NMOS T_p.

Resistors Rg1, Rg2 are used to limit the current of voltage VH_lim in the blocked state of device 102 in the event of a short circuit at device 102 to ground 115 or in subsequent circuit 104. The redundancy ensures this function even in the event of a short circuit of one of resistors Rg1, Rg2.

Capacitors Cg1, Cg2 prevent gate voltage variations in the event of fluctuations in voltage VER of energy reserve 116, for example caused by high dynamic current withdrawals during the trigger circuit activation.

A current-limited voltage, formed from voltage VH_lim and distributor ratio [Rb2*Rb2_1/Rb2+Rb2_1]/{[Rb2*Rb2_1/Rb2+Rb2_1]+Rg1+Rg2} of resistors Rg1, Rg2, Rb2, Rb2_1 at activation terminal 112 used as the output of device 102, develops in the blocked state. For test purposes, this allows testing in a connected system ASIC/FLIC, for example, by measuring voltage VH. When device 102 is controlled, for example in the event of a collision, activation voltage VH<VH_lim−VGth (IVH) develops at activation terminal 112. For test purposes, this may also be checked by measuring voltage VH.

Output capacitors Cout, Cout_1 at activation terminal 112 are used on the one hand for checking energy-limited high current, for example of downstream FLIC high-side output stages, and on the other hand, for suppressing transients coupled into voltage VH. Diode Dout is used for freewheeling of inductive current peaks, for example layout inductances. According to one exemplary embodiment, diode Dout is designed as a Schottky diode.

Device 102 is characterized by very low leakage currents in the sleep state. In addition, according to one exemplary embodiment the use of specific redundant components with greater diversity, for example the resistors, is considered in order to increase the reliability and fail-safe operability of device 102.

According to one exemplary embodiment, device 102 is designed in such a way that device 102 is suitable for sleep airbag control units; i.e., even for a permanent power supply to terminals 220, 224 of supply terminal 110, up to 16.5 V no current (<2 µA at 40° C.) is drawn, provided that no collision occurs.

In device 102, according to one exemplary embodiment, pass-through switch T_p is designed for providing a defined high-impedance connection between elements (110; 230; T_kop, D1, Rg2, Rg1, and T_D1 and VH) for test purposes.

According to one exemplary embodiment, device 102 includes an output protective diode (cathode) at output VH and an anode at ground terminal 115 for freewheeling of inductive transients caused by switching operations in safety unit 104 or by inductive pulse injection in trigger circuits of safety unit 104 in the event of a collision.

According to one exemplary embodiment, the function of device 102 is blocked by monitoring the VH voltage, i.e., high-impedance VH level (P_SVR=0 or high Z), and may be tested as follows:

VH_HZ=VH_lim*(Rb2_1 II Rb2)/(Rb2_1 II Rb2+Rg1+Rg2)+0.1 V−IVH_HZ*(Rb2_1 II Rb2)*(Rg1+Rg2)/(Rb2_1 II Rb2+Rg1+Rg2), for example VH_lim*8.57 k/9.78 k+0.1−IVH_HZ*1.06 k IVH_HZ supply current of the safety unit in the normal case (no collision), or IVH_HZ_TEST (no collision, but with test current consumption at VH of safety unit 104).

According to one exemplary embodiment, device 102 may be tested for its conductive function, i.e., low-impedance VH level (P_SVR=0 or high Z), by monitoring the VH voltage: VH_LZ=VH_lim−VGSth_T_P−0*IVH_LZ_TEST without a measurable dependency on a test current consumption at VH.

Voltages 222, 226 are generally formed from a vehicle battery that is buffered by a generator. Terminal 15/15R is applied via a switch. According to such an exemplary embodiment, such a switch is situated in a line that connects element 226 to terminal 224, for example between element 226 and the diode shown in FIG. 3.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A device for providing an activation voltage for a safety unit for a vehicle, the activation voltage being a limited, switchable (high/low-impedance) trigger high-side supply voltage, the device comprising:
a supply terminal for applying a first supply voltage potential;
an activation terminal in the form of an output for outputting the activation voltage;
a control terminal for reading in a control signal;
a ground terminal for a second supply potential;
a pass-through switch with a control input, the pass-through switch being connected between the supply terminal and the activation terminal and designed for providing a conductive, low-impedance, connection between the supply terminal and the activation terminal when a first signal level is present at the control input, and for blocking the conductive connection between the supply terminal and the activation terminal when a second signal level is present at the control input;
a first control switch with a first terminal, a second terminal, and a control input, the first terminal being connected to the control input of the pass-through switch, the second terminal being connected to the activation terminal, and the control input being connected to the control input of the pass-through switch via a first resistor;
a second control switch with a first terminal, a second terminal and a control input, the first terminal being connected to the control input of the first control switch via at least one second resistor, the second terminal being connected to a second supply voltage potential, and the control input being connected to the supply terminal via at least one third resistor, and to the second supply voltage potential via a diode; and
a third control switch with a first terminal, a second terminal and a control input, the first terminal being connected to the control input of the second control switch, the second terminal being connected to the second supply voltage potential, and the control input being connected to the control terminal.

2. The device as recited in claim 1, wherein the second control switch is open and nonconducting when the third control switch is closed in response to the control signal read in by the control terminal.

3. The device as recited in claim 1, wherein the at least one second resistor includes two second resistors connected in parallel to one another.

4. The device as recited in claim 1, wherein the at least one third resistor includes a series connection made up of a first resistor pair connected in parallel and a second resistor pair connected in parallel.

5. The device as recited in claim 1, further comprising:
a limit switch with a first terminal, a second terminal and a control input, the first terminal being connected to the supply terminal, the second terminal being connected to the control input of the pass-through switch, and the control input being connected to the supply terminal via at least one fourth resistor and to the second supply voltage potential via a diode.

6. The device as recited in claim 1, wherein the pass-through switch, the first control switch, the second control switch, and the third control switch are transistors.

7. The device as recited in claim 1, wherein at least one of: (i) the pass-through switch is a power MOS transistor, (ii) the first control switch is a bipolar transistor, and (iii) the second control switch is an NMOS transistor.

8. The device as recited in claim 1, wherein the safety unit is a sleep airbag control unit.

9. The device as recited in claim 1, wherein the pass-through switch provides a defined high-impedance connection between the elements for test purposes.

10. The device as recited in claim 1, further comprising:
an output protective diode with the cathode at the activation terminal and with the anode at the ground terminal for freewheeling of inductive transients caused by at least one of: (i) switching operations in the safety unit, and (ii) inductive pulse injection in trigger circuits of the safety unit in the event of a collision.

11. A safety device for a vehicle, comprising:
a device for providing an activation voltage for a safety unit for a vehicle, the activation voltage being a limited, switchable (high/low-impedance) trigger high-side supply voltage, the device including a supply terminal for applying a first supply voltage potential, an activation terminal in the form of an output for outputting the activation voltage, a control terminal for reading in a control signal, a ground terminal for a second supply potential, a pass-through switch with a control input, the pass-through switch being connected between the supply terminal and the activation terminal and designed for providing a conductive, low-impedance, connection between the supply terminal and the activation terminal when a first signal level is present at the control input, and for blocking the conductive connection between the supply terminal and the activation terminal when a second signal level is present at the control input, a first control switch with a first terminal, a second terminal, and a control input, the first terminal being connected to the control input of the pass-through switch, the second terminal being connected to the activation terminal, and the control input being connected to the control input of the pass-through switch via a first resistor, a second control switch with a first terminal, a second terminal and a control input, the first terminal being connected to the control input of the first control switch via at least one second resistor, the second terminal being connected to a second supply voltage potential, and the control input being connected to the supply terminal via at least one third resistor, and to the second supply voltage potential via a diode, and a third control switch with a first terminal, a second terminal and a control input, the first terminal being connected to the control input of the second control switch, the second terminal being connected to the second supply voltage potential, and the control input being connected to the control terminal;
at least one vehicle battery that is connected to the supply terminal and to the ground terminal of the device to provide a battery voltage, as the first supply voltage potential against the ground terminal, to the supply terminal;
an energy reserve unit connected to the supply terminal and to the ground terminal of the device to provide a reserve voltage, as the second supply voltage potential against the ground terminal, to the supply terminal; and
the safety unit connected to the activation terminal of the device to be supplied with trigger current by a low impedance switched, limited trigger high-side supply voltage in the event of a collision.

12. The safety device as recited in claim 11, wherein the safety unit is an occupant protection device.

13. The safety device as recited in claim 11, further comprising:
at least one vehicle battery, which as a permanent power supply is connected to the supply terminal, and as a switched power supply is connected to the supply terminal and to the ground terminal of the device to provide a battery voltage, as the first supply voltage potential against the ground terminal, to the supply terminal.

14. A method for providing an activation voltage for a safety unit for a vehicle, using a device, the activation voltage being a limited, switchable (high/low-impedance) trigger high-side supply voltage, the method comprising:
providing the device, the device including a supply terminal for applying a first supply voltage potential, an activation terminal in the form of an output for outputting the activation voltage, a control terminal for reading in a control signal, a ground terminal for a second supply potential, a pass-through switch with a control input, the pass-through switch being connected between the supply terminal and the activation terminal and designed for providing a conductive, low-impedance, connection between the supply terminal and the activation terminal when a first signal level is present at the control input, and for blocking the conductive connection between the supply terminal and the activation terminal when a second signal level is present at the control input, a first control switch with a first terminal, a second terminal, and a control input, the first terminal being connected to the control input of the pass-through switch, the second terminal being connected to the activation terminal, and the control input being connected to the control input of the pass-through switch via a first resistor, a second control switch with a first terminal, a second terminal and a control input, the first terminal being connected to the control input of the first control switch via at least one second resistor, the second terminal being connected to a second supply voltage potential, and the control input being connected to the supply terminal via at least one third resistor, and to the second supply voltage potential via a diode, and a third control switch with a first terminal, a second terminal and a control input, the first terminal being connected to the control input of the second control switch, the second terminal being connected to the second supply voltage potential, and the control input being connected to the control terminal;

applying the supply voltages, with a fixed ground reference point, to the supply terminal of the device with a permanent ground terminal; and providing the control signal to the control terminal of the device.

15. The method as recited in claim 14, wherein in the applying, supply voltages with a fixed ground reference point are applied to the supply terminal of the device with the permanent ground terminal.

* * * * *